United States Patent
Liu et al.

(10) Patent No.: US 11,803,752 B2
(45) Date of Patent: Oct. 31, 2023

(54) SEPARATE DEPLOYMENT OF MACHINE LEARNING MODEL AND ASSOCIATED EMBEDDING

(71) Applicant: Advanced New Technologies Co., Ltd., George Town (KY)

(72) Inventors: Yongchao Liu, Hangzhou (CN); Sizhong Li, Hangzhou (CN); Guozhen Pan, Hangzhou (CN); Jianguo Xu, Hangzhou (CN); Qiyin Huang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/165,509

(22) Filed: Feb. 2, 2021

(65) Prior Publication Data

US 2021/0158165 A1    May 27, 2021

Related U.S. Application Data

(63) Continuation of application No. PCT/CN2019/112895, filed on Oct. 24, 2019.

(30) Foreign Application Priority Data

Dec. 13, 2018   (CN) .......................... 201811522364.0

(51) Int. Cl.
   *G06N 3/08*    (2023.01)
   *G06N 3/04*    (2023.01)

(52) U.S. Cl.
   CPC .................. *G06N 3/08* (2013.01); *G06N 3/04* (2013.01)

(58) Field of Classification Search
   CPC .................................... G06N 3/08; G06N 3/04
   See application file for complete search history.

(56) References Cited

U.S. PATENT DOCUMENTS

| | | |
|---|---|---|
| 9,141,916 B1 | 9/2015 | Corrado et al. |
| 9,984,062 B1 * | 5/2018 | Strope ..................... G06F 16/31 |

(Continued)

FOREIGN PATENT DOCUMENTS

| | | |
|---|---|---|
| CN | 106127297 A | 11/2016 |
| CN | 107330032 A | 11/2017 |

(Continued)

OTHER PUBLICATIONS

Cheng et al, "Wide & Deep Learning for Recommender Systems", 2016, Proceedings of the 1st Workshop on Deep Learning for Recommender Systems, pp. 7-10. (Year: 2016).*

(Continued)

*Primary Examiner* — Benjamin P Geib
*Assistant Examiner* — Clint Mullinax
(74) *Attorney, Agent, or Firm* — Seed IP Law Group LLP

(57) ABSTRACT

Implementations of the present specification provide a model-based prediction method and apparatus. The method includes: a model running environment receives an input tensor of a machine learning model; the model running environment sends a table query request to an embedding running environment, the table query request including the input tensor, to request low-dimensional conversion of the input tensor; the model running environment receives a table query result returned by the embedding running environment, the table query result being obtained by the embedding running environment by performing embedding query and processing based on the input tensor; and the model running environment inputs the table query result into the machine learning model, and runs the machine learning model to complete model-based prediction.

19 Claims, 3 Drawing Sheets

(56) References Cited

U.S. PATENT DOCUMENTS

| | | | |
|---|---|---|---|
| 10,395,118 B2* | 8/2019 | Yu | G06N 3/044 |
| 2004/0236806 A1 | 11/2004 | Turner | |
| 2013/0114811 A1* | 5/2013 | Boufounos | H04K 1/00 |
| | | | 380/255 |
| 2014/0279774 A1 | 9/2014 | Wang et al. | |
| 2016/0247061 A1 | 8/2016 | Trask et al. | |
| 2017/0213126 A1 | 7/2017 | Hammond et al. | |
| 2017/0300814 A1* | 10/2017 | Shaked | G06N 3/047 |
| 2018/0197068 A1 | 7/2018 | Narayanaswami et al. | |
| 2018/0276691 A1* | 9/2018 | Li | G06Q 10/0631 |
| 2019/0073590 A1* | 3/2019 | Wu | G06N 3/063 |

FOREIGN PATENT DOCUMENTS

| | | |
|---|---|---|
| CN | 107423817 A | 12/2017 |
| CN | 107563442 A | 1/2018 |
| CN | 107944027 A | 4/2018 |
| CN | 108153853 A | 6/2018 |
| CN | 108492273 A | 9/2018 |
| CN | 108805795 A | 11/2018 |
| CN | 108885571 A | 11/2018 |
| CN | 110033091 A | 7/2019 |
| TW | 201833767 A | 9/2018 |
| TW | 201837737 A | 10/2018 |
| TW | 201841132 A | 11/2018 |
| WO | 2017/161320 A1 | 9/2017 |

OTHER PUBLICATIONS

Luo Fangqiong, "Precipitation Forecast Model Based on LLE Algorithm and Optimized RBF Neural Network," Computer and Digital Engineering 41(5):749-752, 2013.

Extended European Search Report, dated Sep. 23, 2021, for European Application No. 19895453.9-1208, 13 pages.

Zhou et al., "Deep Interest Network for Click-Through Rate Prediction," arXiv: 1706.06978v2 [stat.ML], Jun. 23, 2017, 13 pages.

* cited by examiner

SEPARATE DEPLOYMENT OF MACHINE LEARNING MODEL AND ASSOCIATED EMBEDDING

BACKGROUND

Technical Field

The present disclosure relates to the field of machine learning technologies, and in particular, to the deployment of machine learning model and associated embedding.

Description of the Related Art

In artificial intelligence, feature engineering is a very important part. Feature engineering is a process of converting input data of a machine learning model into a feature vector, and is an important start step in machine learning. Embedding is a data conversion method in feature engineering. The input data in machine learning can be a high-dimensional tensor, and the high-dimensional tensor can be mapped to low-dimensional continuous space by using an embedding layer, to achieve feature extraction. Mapping high-dimensional space to such low dimensional space makes machine learning on large input (typically, a high-dimensional sparse tensor) easier.

However, the embedding layer usually has a very large number of parameters. In some service scenarios, the total memory amount of all the parameters of the embedding layer can reach a level of hundreds of billions (for example, 100 GB to 1 TB memory). This case poses a great challenge to the deployment and prediction of a real-time online model: A single machine cannot provide sufficient shared memory to store the whole model, and therefore customized machines need to be purchased to provide services, which increases the costs of device acquisition, running, and maintenance. In addition, the capacity of a single machine is occupied by a relatively large embedding layer, and therefore the execution of the model cannot fully utilize the computing capability of underlying hardware resources, which causes a waste of resources.

BRIEF SUMMARY

In view of this, one or more implementations of the present specification provide a separation in the deployment of machine learning model and its associated embedding processing. These techniques, among others, reduce the costs of model running and better utilize resource capabilities.

Specifically, the one or more implementations of the present specification are implemented by using the following technical solutions:

According to a first aspect, a model-based prediction method is provided. The method is performed by a machine learning model system, the system including a machine learning model and an embedding model for converting an input tensor of the machine learning model, the embedding model being deployed separately from the machine learning model, the embedding model being deployed in an embedding running environment, and the machine learning model being deployed in a model running environment; and the method includes: receiving, by the model running environment, an input tensor of the machine learning model; sending, by the model running environment, a table query request to the embedding running environment, the table query request including the input tensor, to request low-dimensional conversion of the input tensor; receiving, by the model running environment, a table query result returned by the embedding running environment, the table query result being obtained by the embedding running environment by performing embedding query and processing based on the input tensor; and inputting, by the model running environment, the table query result into the machine learning model, and running the machine learning model to complete model-based prediction.

According to a second aspect, a machine learning model system is provided. The system includes an embedding running environment and a model running environment, an embedding model being deployed in the embedding running environment, and a machine learning model being deployed in the model running environment; the model running environment being configured to receive an input tensor of the machine learning model; being configured to send a table query request to the embedding running environment, the table query request including the input tensor, to request low-dimensional conversion of the input tensor; and being further configured to input a table query result into the machine learning model, and run the machine learning model to complete model-based prediction; and the embedding running environment being configured to perform embedding query and processing on the input tensor based on the table query request, to obtain the table query result; and feed the table query result back to the model running environment.

According to a third aspect, a model-based prediction device is provided. The device includes a memory, a processor, and computer instructions that are stored in the memory and can be run on the processor, the processor implementing an embedding running environment and a model running environment when executing the instructions, the embedding running environment being configured to run an embedding model, the model running environment being configured to run a machine learning model, and the processor executing the instructions to implement the following steps: receiving, by the model running environment, an input tensor of the machine learning model; sending, by the model running environment, a table query request to the embedding running environment, the table query request including the input tensor, to request low-dimensional conversion of the input tensor; receiving, by the model running environment, a table query result returned by the embedding running environment, the table query result being obtained by the embedding running environment by performing embedding query and processing based on the input tensor; and inputting, by the model running environment, the table query result into the machine learning model, and running the machine learning model to complete model-based prediction.

According to the model-based prediction method and apparatus in the one or more implementations of the present specification, because the model and the embedding are deployed separately, when memory of a single machine is insufficient, other, separate memory can be used to store the model or the embedding, thereby reducing the costs of model running and maintenance. In other words, a single machine does not need specialized expansion or addition of memory to accommodate both the model and embedding, which typically would be accompanied with high expense and technological complications. The separate deployment also provides the flexibility of multiple-to-one, one-to-multiple, and/or multiple-to-multiple associations between models and embeddings, in addition to the typical one-to-one association between the two for traditional, single environment deployment of the entire machine learning system. Such flexibility allows for nimbler system architecture and enhances reusability of established computational functions. Further, in this separate deployment structure, a computing resource of a network virtual execution unit can be fully used for model running prediction, and the computing capability of underlying hardware resources can be fully utilized.

BRIEF DESCRIPTION OF THE SEVERAL VIEWS OF THE DRAWINGS

To describe the technical solutions in the one or more implementations of the present specification or in the existing technologies more clearly, the following is a brief introduction of the accompanying drawings required for describing the implementations or the existing technologies. Apparently, the accompanying drawings in the following description show merely some of the one or more implementations of the present specification, and a person of ordinary skill in the art can still derive other drawings from these accompanying drawings without making innovative efforts.

DETAILED DESCRIPTION

To make a person skilled in the art better understand the technical solutions in the one or more implementations of the present specification, the following clearly and completely describes the technical solutions in the one or more implementations of the present specification with reference to the accompanying drawings in the one or more implementations of the present specification. Apparently, the described implementations are merely some but not all of the implementations of the present specification. All other implementations obtained by a person of ordinary skill in the art based on the one or more implementations of the present specification without innovative efforts shall fall within the protection scope of the present disclosure.

Embedding is a common data conversion method in feature engineering, and can be used to map a large sparse vector to low-dimensional space that retains a semantic relationship. The embedding is implemented as follows: An embedding model is trained, and embedding query is performed by using the embedding model, so that an input tensor (for example, a sparse tensor) of a machine learning model can be used as an index for querying the embedding model, to map the original high-dimensional tensor to low-dimensional space.

For example, the input tensor is represented by using a one-hot encoding method. Each type is represented as a very long vector by using the one-hot encoding method. The number of dimensions of the vector is the total number of types. Most elements are 0, and the value of only one dimension is 1. That dimension represents a current type. In this case, if one-hot encoding is used, a generated feature dimension is often very large. For example, in the natural language field, each word can be represented by a very long vector by using one-hot encoding. For such a high-dimensional vector, a relatively popular method in the artificial intelligence field is to connect these features to an embedding layer to map these features to low-dimensional space, to achieve feature extraction.

It can be learned from the above that, a relationship between the embedding and the machine learning model is as follows: The embedding can be used to convert an input tensor of the machine learning model from high-dimensional space into low-dimensional space, and then input a converted result into the machine learning model. Conversion from high-dimensional space into low dimensional space through embedding makes machine learning on large input (typically, a high-dimensional sparse tensor) easier. In addition, an embedding model learned for a machine learning model can also be used for other machine learning models, and the embedding model can be trained separately, or can be learned as a part of the machine learning model. For example, the embedding model can be an embedding table obtained through training.

Figure 1:
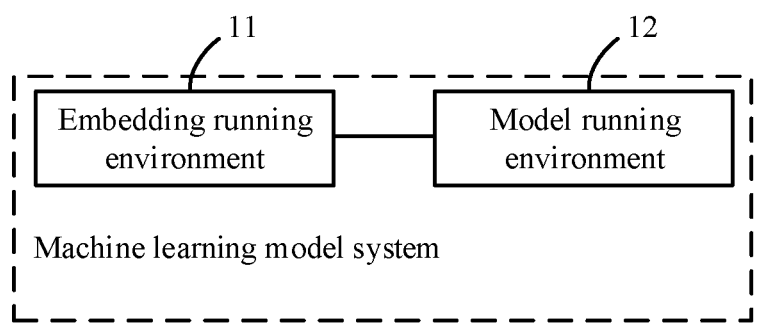
FIG. 1 illustrates a machine learning model system according to one or more implementations of the present specification.

At least one implementation of the present specification provides a machine learning model system. As shown in FIG. 1, the system can include embedding running environment 11 and model running environment 12. An embedding model is deployed in the embedding running environment 11. Specifically, an embedding table can be deployed in the embedding running environment 11. A machine learning model can be deployed in the model running environment 12. For example, a deep neural network model can be deployed in the model running environment 12.

Embedding running environment 11 or model running environment 12 can be a physical execution unit, or can be a virtual execution unit. For example, the physical execution unit can be a physical device such as a server, and the virtual execution unit can be a virtualization container, etc. An embedding model can be deployed in the embedding running environment 11, and the embedding running environment 11 can further perform embedding query, processing, etc. A machine learning model can be deployed in the model running environment 12, so that the model running environment 12 runs the model for prediction.

The machine learning model system shown in FIG. 1 is a system in which embedding is deployed separately from a machine learning model. For example, the embedding running environment 11 and the model running environment 12 each can be a virtualization container. Specifically, the embedding running environment 11 and the model running environment 12 each can run a container instance. For example, docker can be used as the container. Alternatively, a VMware virtual machine, Amazon Firecracker, etc., can be used as the virtual execution unit.

In a system architecture of separate deployment, an input tensor can be input into the model running environment 12, and then the model running environment 12 can send a table query request to the embedding running environment 11. The embedding running environment 11 can perform embedding query, for example, querying an embedding table deployed in the embedding running environment 11 by using the input tensor as an index or indices, mapping the high-dimensional tensor to a low-dimensional space, and returning a table query result to the model running environment 12. The model running environment 12 can continue to run the model based on the table query result.

To implement communication and interaction between the model running environment 12 and the embedding running environment 11, the model running environment 12 and embedding running environment 11 can be interconnected by a network, to implement the sending of the table query request or feedback of the table query result. For example, when the embedding running environment 11 and model running environment 12 each are a virtualization container for physical deployment, the model running environment 12 and its associated embedding running environment 11 for table queries can be deployed on the same physical node, or can be deployed on different physical nodes. When the model running environment 12 and the embedding running environment 11 are located on the same physical node, the model running environment 12 can locally send table query requests. When the model running environment 12 and the embedding running environment 11 are located on different physical nodes, the model running environment 12 can remotely send table query requests.

Figure 2:
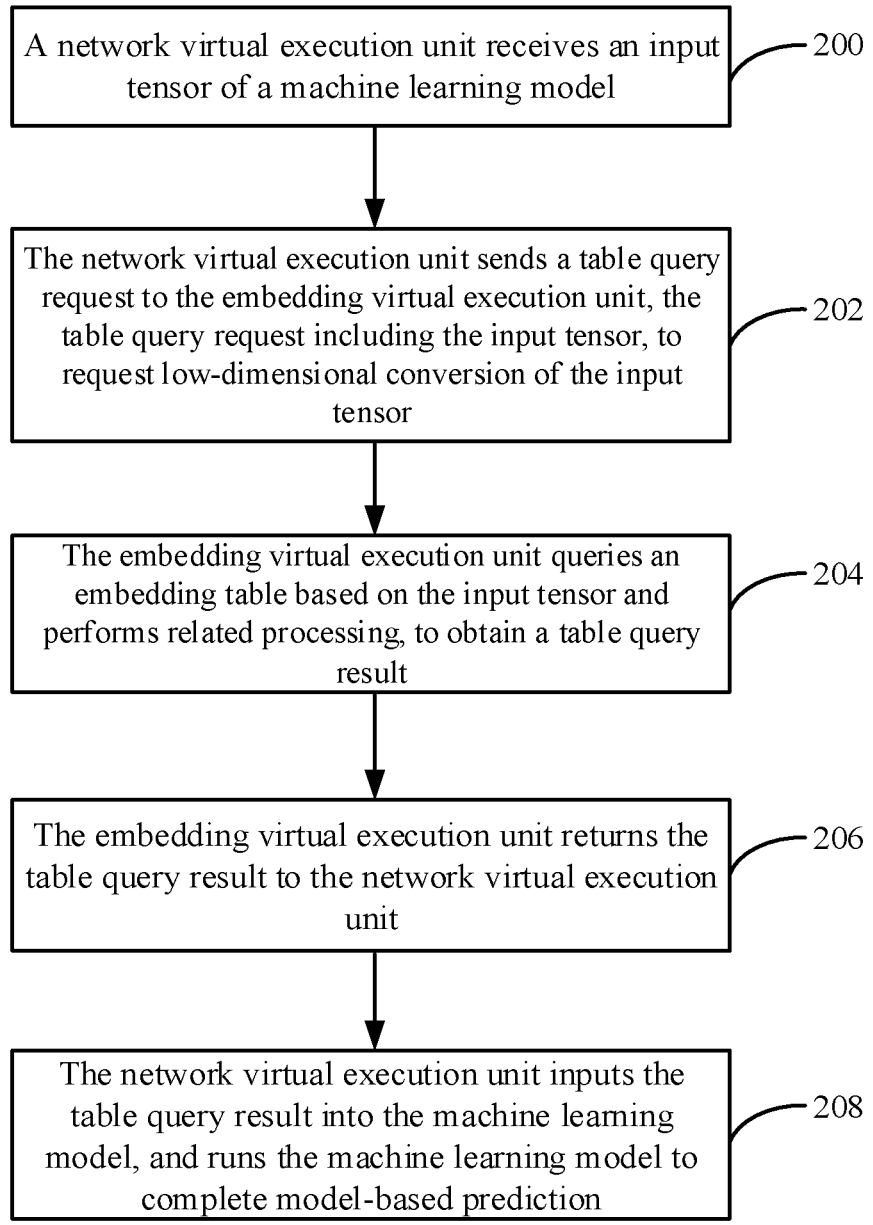
FIG. 2 illustrates a model-based prediction method according to one or more implementations of the present specification.

FIG. 2 illustrates a procedure of a model-based prediction method provided in at least one implementation of the present specification. The method is based on a machine learning model system deployed as shown in FIG. 1. After being deployed as shown in FIG. 1, the machine learning model system can perform the model-based prediction method to apply a model for prediction. In this implementation, for example, a model running environment and an embedding running environment each are a virtualization container. In this case, the model running environment can be referred to as a network virtual execution unit, and the embedding running environment can be referred to as an embedding virtual execution unit. In addition, in the following description, for example, an embedding model is an embedding table.

As shown in FIG. 2, the method can include the following steps.

In step 200, the network virtual execution unit receives an input tensor of the machine learning model.

For example, the input tensor of the machine learning model can be received by the network virtual execution unit, and the input tensor can be a high-dimensional tensor that needs low-dimensional conversion processing.

In step 202, the network virtual execution unit sends a table query request to the embedding virtual execution unit, the table query request including the input tensor, to request low-dimensional conversion of the input tensor.

For example, the network virtual execution unit can send the table query request to the embedding virtual execution unit, and send the input tensor received in step 200 to the embedding virtual execution unit, to request low-dimensional conversion processing on the input tensor.

In step 204, the embedding virtual execution unit queries an embedding table based on the input tensor and performs related processing, to obtain a table query result.

For example, it is assumed that the input tensor is v=(0, 0, 0, 1, 1). A person of skill in the art would understand that the dimensionality of the input tensor can be much higher (e.g., hundreds or thousands of dimensions) in many cases.

The embedding table stored in the embedding virtual execution unit can be as follows:

TABLE 1

| Emb table | |
|---|---|
| Index | Vector |
| 0 | (1, 2, 3, 4) |
| 1 | (5, 6, 7, 8) |
| 2 | (9, 10, 11, 12) |

TABLE 1-continued

| Emb table | |
|---|---|
| Index | Vector |
| 3 | (13, 14, 15, 16) |
| 4 | (17, 18, 19, 20) |

A person of skill in the art would understand that the vectors in the embedding table typically have a much lower dimensionality (e.g., by multiple orders of magnitude) than the input tensor. Using the dimensions with "1" values in the input tensor v as indices, two vectors can be obtained by querying the embedding (Emb) table based on the input tensor v:

V1=(13, 14, 15, 16); and

V2=(17, 18, 19, 20).

Then, the embedding virtual execution unit can perform processing, such as summation or averaging, on the two vectors V1 and V2, for example, V1+V2 or (V1+V2)/2.

After performing the processing such as summation or averaging, the embedding virtual execution unit returns a summation result or an averaging result to the network virtual execution unit as the query result. In this example, summing or averaging is used as an example for processing. Alternatively, other processing can be performed. In addition, because the embedding virtual execution unit performs the processing such as summation or averaging, and then returns the summation result or the averaging result to the network virtual execution unit, the requirement for bandwidth can be reduced.

In step 206, the embedding virtual execution unit returns the table query result to the network virtual execution unit.

In step 208, the network virtual execution unit inputs the table query result into the machine learning model, and runs the machine learning model to complete model-based prediction.

For example, after receiving the table query result, the network virtual execution unit can use the table query result as input to the machine learning model, and continue to run the machine learning model to complete model-based prediction.

According to the model-based prediction method in this implementation, because a model is deployed separately from embedding, when memory of a single machine is insufficient, other, separate memory can be used to store the model or the embedding, thereby reducing the costs of model running and maintenance. In addition, in this separate deployment structure, the computing resource of the network virtual execution unit can be fully used for model running prediction, and the computing capability of underlying hardware resources can be fully utilized.

In addition, the machine learning model system can include at least one embedding virtual execution unit and at least one network virtual execution unit. Each embedding virtual execution unit runs one embedding model, and each network virtual execution unit runs one machine learning model.

Figure 3:
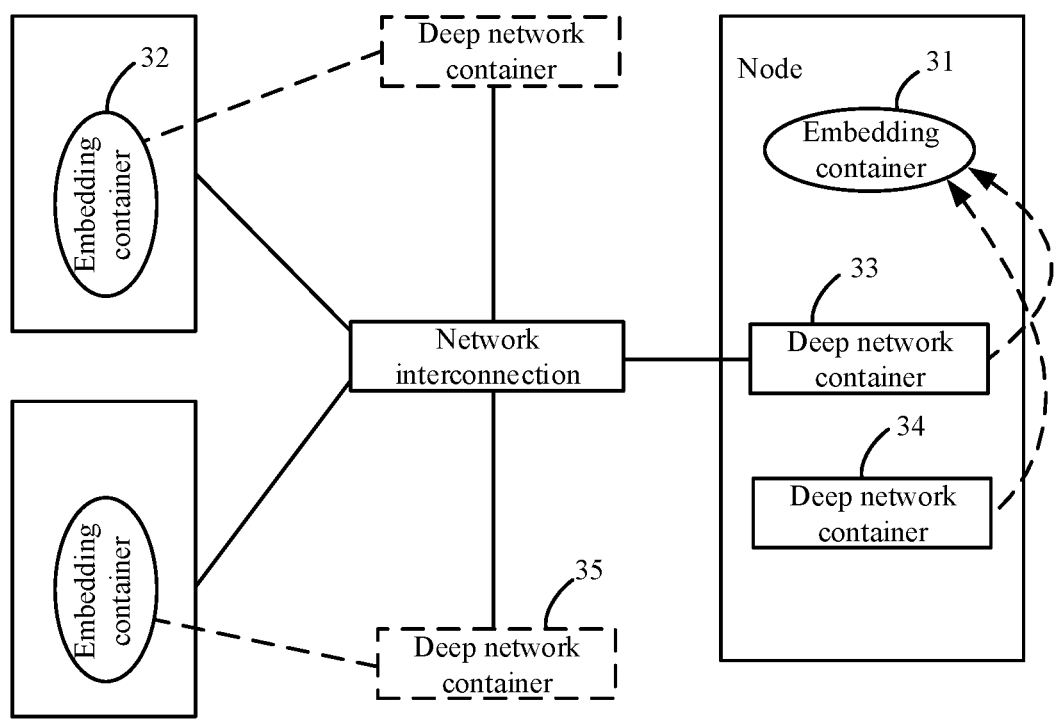
FIG. 3 illustrates a machine learning model system according to one or more implementations of the present specification.

Referring to FIG. 3, for example, if a virtual execution unit is a container, then an embedding virtual execution unit is an embedding container, and a network virtual execution unit is a network container; and if a deep neural network is run and deployed in the network container, the network container can be referred to as a deep network container.

A machine learning model system shown in FIG. 3 includes multiple embedding containers, for example, embedding container 31 and embedding container 32, and further includes multiple deep network containers, for example, deep network container 33, deep network container 34, and deep network container 35. Multiple copies of the same embedding model can be deployed in multiple containers, to scalably support a large amount of concurrent query access. For example, an embedding model deployed in embedding container 32 can be a copy of an embedding model deployed in embedding container 31.

The embedding container and the deep network container can be run on the same physical machine, or can be broadly distributed in any corners of a cluster. Different hardware resources can be configured for different network virtual execution units, and the hardware resources can adapt to running requirements of machine learning models on the network virtual execution units. For example, the hardware resource can include at least one of the following: a central processing unit (CPU) or a hardware accelerator. The hardware accelerator can include but is not limited to a graphics processing unit (GPU), a field-programmable gate (FPGA), or an application-specific integrated circuit (ASIC) chip designed for a specific purpose.

A computing resource can be allocated based on various constraints such as computing complexity and a service latency requirement of the deep neural network, to make full use of a computing capability of underlying hardware. For example, in a service scenario with a strict latency requirement, a hardware accelerator such as a GPU, an FPGA, or an AI chip can be deployed in the deep neural network container to replace a plurality of CPU cores, to complete relatively complex deep network model reasoning within specified time. For a deep neural network model with relatively low computing complexity, a single CPU core possibly can meet a requirement. In this case, only one CPU core needs to be configured for one corresponding deep network container.

In the system shown in FIG. 3, the embedding model is deployed in an embedding container with sufficient memory, and can provide services to other containers that need embedding table query through local or remote connections. For example, the deep network container is responsible for running the deep neural network for model reasoning. For example, if deep network container 33 locally sends a table query request to embedding container 31, deep network container 33 and embedding container 31 are located on the same node. After receiving an input tensor (which can be dense or sparse) from a user, the deep network container sends a table query request to the embedding container, and inputs a received table query result into the deep neural network to complete model reasoning and prediction.

In addition, the machine learning model in the at least one implementation of the present specification includes but is not limited to a deep neural network model, such as a Wide & Deep model or a DeepFM model. The deep neural network model can be a machine learning neural network in which at least one hidden layer is added between an input layer and an output layer.

The apparatus or module described in the above implementations can be specifically implemented by a computer chip or an entity, or can be implemented by a product with a certain function. A typical implementation device is a computer, and a specific form of the computer can be a personal computer, a laptop computer, a cellular phone, a camera phone, a smartphone, a personal digital assistant, a media player, a navigation device, an e-mail sending/receiving device, a game console, a tablet computer, a wearable device, or a combination of any several of these devices.

For ease of description, the above apparatus is divided into various modules based on functions for separate description. Certainly, during implementation of the one or more implementations of the present specification, the functions of the modules can be implemented in the same or more pieces of software and/or hardware.

An execution order of the steps in the procedure shown in the above figure is not limited to the order in the flowchart. In addition, description of each step can be implemented in a form of software, hardware, or a combination thereof. For example, a person skilled in the art can implement the description of each step in a form of software code. The description of each step can be computer-executable instructions that can implement a logical function corresponding to the step. When the description of each step is implemented in a software way, the executable instructions can be stored in a memory and executed by a processor in the device.

For example, corresponding to the above method, the one or more implementations of the present specification also provide a model-based prediction device. The device includes a memory, a processor, and computer instructions that are stored in the memory and can be run on the processor, the processor implementing an embedding running environment and a model running environment when executing the instructions, the embedding running environment being configured to run embedding, the model running environment being configured to run a machine learning model, and the processor executing the instructions to implement the following steps: receiving, by the model running environment, an input tensor of the machine learning model; sending, by the model running environment, a table query request to the embedding running environment, the table query request including the input tensor, to request low-dimensional conversion of the input tensor; receiving, by the model running environment, a table query result returned by the embedding running environment, the table query result being obtained by the embedding running environment by performing embedding query and processing based on the input tensor; and inputting, by the model running environment, the table query result into the machine learning model, and running the machine learning model to complete model-based prediction.

It is worthwhile to further note that the term "include," "comprise," or their any other variant is intended to cover a non-exclusive inclusion, so that a process, method, commodity, or device that includes a series of elements not only includes those elements but also includes other elements that are not expressly listed, or further includes elements inherent to such process, method, commodity, or device. An element preceded by "includes a . . . " does not, without more constraints, preclude the presence of additional identical elements in the process, method, commodity, or device that includes the element.

A person skilled in the art should understand that the one or more implementations of the present specification can be provided as a method, a system, or a computer program product. Therefore, the one or more implementations of the present specification can use a form of hardware only implementations, software only implementations, or implementations with a combination of software and hardware. Moreover, the one or more implementations of the present specification can use a form of a computer program product that is implemented on one or more computer-usable storage media (including but not limited to a magnetic disk memory, a CD-ROM, an optical memory, etc.) that include computer-usable program code.

The one or more implementations of the present specification can be described in common contexts of computer-executable instructions executed by a computer, such as a program module. Generally, the program module includes a routine, program, object, component, data structure, etc., for executing a particular task or implementing a particular abstract data type. Alternatively, the one or more implementations of the present specification can be practiced in distributed computing environments. In these distributed computing environments, tasks are executed by remote processing devices that are connected by using a communications network. In a distributed computing environment, program modules can be located in both local and remote computer storage media including storage devices.

The implementations of the present specification are all described in a progressive way, for same or similar parts in the implementations, references can be made to each other, and each implementation focuses on a difference from other implementations. Especially, the data processing device implementation is basically similar to the method implementation, and therefore is described briefly. For related parts, references can be made to pars of the method implementation descriptions.

The specific implementations of the present specification are described above. Other implementations fall within the scope of the appended claims. In some cases, the actions or steps described in the claims can be performed in an order different from the order in the implementations and can still achieve the desired results. In addition, the process depicted in the accompanying drawings does not necessarily require the shown particular order or sequence to achieve the desired results. In some implementations, multi-task processing and parallel processing can or may be advantageous.

What described above is only exemplary implementations of the one or more implementations of the present specification, but is not intended to the one or more implementations of the present specification, and any modifications, equivalent replacements, improvements, etc., that are made within the spirit and principles of the one or more implementations of the present specification shall all be included within the protection scope of the one or more implementations of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A model-based prediction method performed by a machine learning system, the method comprising:
   receiving, by a model running environment of a plurality of model running environments, an input tensor of a machine learning model including at least one of a Wide & Deep model or a Deep Factorization Machine model, wherein the model running environment accommodates the machine learning model on a first computing node of a plurality of computing nodes, and wherein another model running environment of the plurality of model running environments accommodates another machine learning model that is different than the machine learning model on a second computing node of the plurality of computing nodes;
   sending, by the model running environment, a table query request to an embedding model deployed in an embedding running environment of a plurality of embedding running environments, the table query request including the input tensor, to request low-dimensional conversion of the input tensor, wherein a memory of the first computing node is insufficient to accommodate both the machine learning model and the embedding model, the embedding running environment accommodates the embedding model on a third computing node of the plurality of computing nodes, and another embedding running environment of the plurality of embedding environments accommodates a copy of the embedding model on a fourth computing node of the plurality of computing nodes to be concurrently accessible to the other machine learning model;
   obtaining, by the embedding running environment, a plurality of vectors based on the table query request and the input tensor;
   generating a table query result based on the obtained plurality of vectors, wherein the table query result is generated, at least in part, by combining the obtained plurality of vectors into a single vector;
   receiving, by the model running environment, the table query result returned by the embedding running environment, the table query result being obtained by the embedding running environment by querying an embedding table for the low-dimensional conversion that is associated with the machine learning model based on the input tensor; and
   inputting, by the model running environment, the table query result into the machine learning model, and executing the machine learning model to complete model-based prediction.

2. The method according to claim 1, wherein the model running environment is a physical execution unit or a virtual execution unit, and the embedding running environment is a physical execution unit or a virtual execution unit.

3. The method according to claim 1, wherein each embedding running environment implements a single embedding model, and each model running environment implements a single machine learning model.

4. A machine learning method performed by a machine learning system executing on a plurality of running environments including a plurality of model running environments and a plurality of embedding running environments, the method comprising:
   receiving, by a model running environment of the plurality of model running environments, an input to a machine learning model implemented on the model running environment, wherein the model running environment accommodates the machine learning model on a first computing node of a plurality of computing nodes, and wherein another model running environment of the plurality of model running environments accommodates another machine learning model on a second computing node of the plurality of computing nodes;

sending, from the model running environment to an embedding model deployed in an embedding running environment of the plurality of embedding environments, a request for converting the input, wherein a memory of the first computing node is insufficient to accommodate both the machine learning model and the embedding model, the embedding running environment accommodates the embedding model on a third computing node of the plurality of computing nodes, and another embedding running environment of the plurality of embedding environments accommodates a copy of the embedding model on a fourth computing node of the plurality of computing nodes to be concurrently accessible to the other machine learning model;

receiving, by the model running environment, a result returned from the embedding running environment, the result including a low-dimensional representation of the input; and feeding, by the model running environment, the low-dimensional representation into the machine learning model to perform model-based prediction.

5. The method according to claim 4, wherein the sending, from the model running environment to the embedding running environment, a request for converting the input includes:
  sending a local request for converting the input, wherein the embedding running environment and the model running environment are located on a same physical node; or
  sending a remote request for converting the input, wherein the embedding running environment and the model running environment are located on different physical nodes.

6. The method according to claim 4, wherein different hardware resources are configured for different model running environments, the hardware resources being adapted to running requirements of machine learning models in the model running environments.

7. The method according to claim 6, wherein the hardware resources each include at least one of a central processing unit or a hardware accelerator.

8. The method of claim 7, wherein the hardware accelerator includes at least one of a field-programmable gate array or an application-specific integrated circuit chip designed for a specific purpose.

9. The method according to claim 4, wherein the machine learning model includes at least one of a Wide & Deep model or a Deep Factorization Machine model.

10. A machine learning system comprising a plurality of embedding running environments and a plurality of model running environments:
  wherein a model running environment of the plurality of model running environments is configured to receive an input for a machine learning model, send a table query request including the input to an embedding model deployed in an embedding running environment of the plurality of embedding running environments, receive a response including a low-dimensional converted value of the input from the embedding running environment, and feed the low-dimensional converted value into the machine learning model to execute model-based prediction;
  wherein the model running environment accommodates the machine learning model on a first computing node of a plurality of computing nodes, another model running environment of the plurality of model running environments accommodates another machine learning model on a second computing node of the plurality of computing nodes; and
  wherein the embedding running environment is configured to perform embedding query based on the input to obtain the low-dimensional converted value by obtaining a plurality of vectors based on the input and generating the response based, at least in part, on combining the plurality of vectors into a single vector, and send the response including the low-dimensional converted value back to the model running environment; and
  wherein a memory of the first computing node is insufficient to accommodate both the machine learning model and the embedding model, the embedding running environment accommodates the embedding model on a third computing node of the plurality of computing nodes, and another embedding running environment of the plurality of embedding environments accommodates a copy of the embedding model on a fourth computing node of the plurality of computing nodes to be concurrently accessible to the other machine learning model.

11. The system according to claim 10, wherein the embedding running environment and the model running environment each are a physical execution unit or a virtual execution unit.

12. The system according to claim 10, wherein each embedding running environment implements at least one embedding model, and each model running environment implements at least one machine learning model.

13. The system according to claim 12, wherein different hardware resources are configured for different model running environments, the hardware resources being adapted to running requirements of machine learning models in the model running environments.

14. A non-transitory storage medium storing contents that, when executed by one or more processors, cause the one or more processors to perform actions comprising:
  receiving, by a model running environment of a plurality of model running environments included in a machine learning system, an input to a machine learning model implemented on the model running environment, wherein the model running environment accommodates the machine learning model on a first computing node of a plurality of computing nodes, and wherein another model running environment of the plurality of model running environments accommodates another machine learning model on a second computing node of the plurality of computing nodes;
  sending, from the model running environment to an embedding model deployed in an embedding running environment of a plurality of embedding running environments included in the machine learning system, a request for converting the input, wherein a memory of the first computing node is insufficient to accommodate both the machine learning model and the embedding model, the embedding running environment accommodates the embedding model on a third computing node of the plurality of computing nodes, and another embedding running environment of the plurality of embedding environments accommodates a copy of the embedding model on a fourth computing node of the plurality of computing nodes to be concurrently accessible to the other machine learning model;

obtaining, by the embedding running environment, a plurality of vectors based on the table query request and the input;

generating a table query result based on the obtained plurality of vectors, wherein the table query result is generated, at least in part, by combining the obtained plurality of vectors into a single vector;

receiving, by the model running environment, a result returned from the embedding running environment, the result including a low-dimensional representation of the input; and feeding, by the model running environment, the low-dimensional representation into the machine learning model to perform a model-based prediction.

15. The storage medium according to claim 14, wherein the model running environment is a physical execution unit or a virtual execution unit, and the embedding running environment is a physical execution unit or a virtual execution unit.

16. The storage medium according to claim 14, wherein the sending, from the model running environment to the embedding running environment, a request for converting the input includes:

sending a local request for converting the input, wherein the embedding running environment and the model running environment are located on a same physical node; or sending a remote request for converting the input, wherein the embedding running environment and the model running environment are located on different physical nodes.

17. The storage medium according to claim 14, wherein the machine learning system includes a plurality of model running environments and different hardware resources are configured for different model running environments, the hardware resources being adapted to running requirements of machine learning models in the model running environments.

18. The storage medium according to claim 17, wherein the hardware resources each include at least one of a central processing unit or a hardware accelerator.

19. The storage medium according to claim 14, wherein the actions further comprise:

training at least one embedding running environment of the plurality of embedding environments separately from training the plurality of model running environments.

* * * * *